Feb. 17, 1953 A. L. DE BRUYNE 2,628,999
CONTINUITY, POLARITY AND BREAKDOWN TEST DEVICE
Filed April 7, 1949
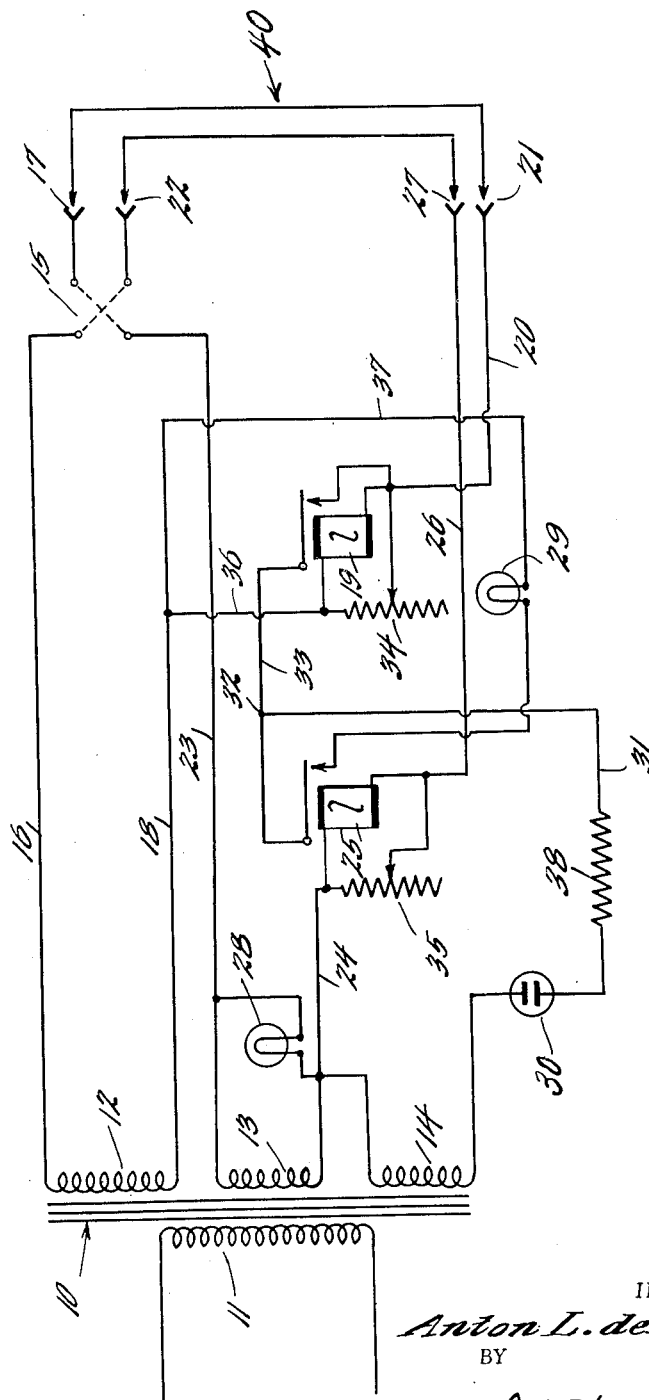
INVENTOR.
Anton L. deBruyne,
BY
C. B. Hamilton
Attorney Patented Feb. 17, 1953

2,628,999

UNITED STATES PATENT OFFICE 2,628,999

CONTINUITY, POLARITY, AND BREAKDOWN TEST DEVICE

Anton L. de Bruyne, Clinton, N. C., assignor to Western Electric Company, Incorporated, New York, N. Y., a corporation of New York Application April 7, 1949, Serial No. 86,012

12 Claims. (Cl. 175—183)

This invention relates to a device for testing electrical equipment, and more particularly to a device for testing electrical conductors for continuity, polarity and breakdown characteristics.

The principal object of the invention is the provision of an efficient and simple device for rapidly testing electrical conductors to determine imperfections therein.

One embodiment of the invention contemplates the provision of an electrical testing device whereby a pair of electrical conductors may be simultaneously tested for continuity, polarity and breakdown characteristics.

Further objects and advantages of the invention will become apparent from the following detailed description when taken in conjunction with the accompanying drawing in which the single figure of the drawing discloses schematically a circuit embodying the invention by means of which the method of testing may be practiced.

Referring now to the drawing, numeral 10 designates a transformer having a primary winding 11 which is energized by a suitable source of alternating current (not shown). The transformer 10 has three secondary windings—12, 13 and 14 of which windings 12 and 13 have the same number of turns but are connected 180° out of phase. A conventional reversing switch 15 has one of its terminals connected to one side of winding 12 and another of its terminals connected to one side of winding 13. The other two terminals of switch 15 are connected to two sockets or clips 17 and 22 and this switch 15 serves to effectively reverse the test sockets or clips 17 and 22 for reasons hereinafter stated. One side of the winding 12 is connected through a conductor 16 and the switch 15 to the socket or clip 17 with the switch 15 in the left hand or polarity normal position. The other side of the winding 12 is connected through a conductor 18, a coil of a normally open relay 19, and a conductor 20 to a socket or clip 21.

One side of the secondary winding 13 is connected directly to the socket or clip 22 through a conductor 23 and the switch 15. The other side of the winding 13 is connected through a conductor 24, a coil of a normally open relay 25, and a conductor 26 to a socket or clip 27. A pilot light 28 is connected directly across the winding 13 to give a visual indication when power is being supplied to the transformer 10.

An indicator lamp 29 is connected in series with the contacts of relays 19 and 25 so as to be energized by the secondary winding 12 when these contacts are closed and a circuit is completed between the sockets or clips 17 and 21.

One side of the secondary winding 14 is connected through the conductor 24, the coil of relay 25, and a conductor 26 to the socket or clip 27. The other side of the winding 14 is connected through a glow discharge tube 30 which acts as a breakdown indicator light, a current limiting resistor 38, a conductor 31 to a junction point 32, through a conductor 33, the contacts of relay 19 when closed, and then through conductor 20 to the socket or clip 21.

Two variable resistance elements 34 and 35 are connected in shunt with the windings of relays 19 and 25, respectively. These resistors serve as current adjustment features to determine the amount of current passing through the apparatus under test and effectively check the apparatus for high resistance connections and materials.

In the operation of the testing device, a piece of electrical equipment 40 to be tested, such, for example, as a two conductor cord or cable, has one of its conductors clipped or otherwise attached between the sockets or clips 17 and 21 and the other conductor connected between sockets or clips 22 and 27.

After proper connection of the equipment 40 under test to the testing device, the transformer 10 is energized. With the transformer energized, an automatic continuity test will be carried out on each of the branches of the equipment under test. The various circuits of this continuity test are traced from the secondary winding 12, through conductor 16, through one side of the reversing switch 15 which is in the left hand (polarity normal) position, clip 17, through one branch of the equipment 40 under test to the clip 21, through conductor 20, the winding of relay 19, a conductor 36, conductor 18, back to winding 12.

The continuity of the other branch of the equipment 40 is tested by a circuit which is traced from one side of the winding 13, through conductor 23, switch 15, socket or clip 22, the second branch of the equipment 40 under test, socket or clip 27, conductor 26, the winding of relay 25, conductor 24 and back to the other side of the winding 13. If the two branches of the circuit 40 under test are continuous, current will flow in each of the circuits traced above and since each of the circuits includes the winding of one of the relays 19 and 25, the contacts of both relays will be closed when both branches under test are continuous.

The closing of the contacts of relays 19 and 25 will cause the energization of a circuit which includes the indicator light 29 and which circuit may be traced from one side of secondary winding 12, through conductor 16, switch 15, socket or clip 17, one branch of the equipment 40 under test, socket or clip 21, conductor 20, the closed contacts of relay 19, conductor 33, the closed contacts of relay 25, indicator light 29, a conductor 37, and the conductor 18 back to the other side of secondary winding 12. It will be apparent, therefore, that the lighting of indicator lamp 29 will be a positive indication that the separate branches of the equipment 40 under test are continuous.

In addition to testing for continuity, it is often necessary to test various types of electrical equipment such, for example, as twisted pairs of insulated conductors of the type used as hearing aid cords, to determine whether or not the polarity of the cords is as indicated thereon. The proper identification of such twisted pairs of conductors can be automatically made by the use of this test device in the following manner. Assuming that the cord or other equipment under test is not polarized correctly, the actual circuit will, in this case, be from socket or clip 17 to socket or clip 27 for one branch of the equipment under test and from socket or clip 22 to socket or clip 21 for the other branch of the equipment under test. With the reversing switch 15 in the left hand (polarity normal) position, the electrical circuit will then include the two secondary windings 12 and 13 in series, but since the two secondary windings 12 and 13 have an equal number of turns and are connected 180° out of phase there will be no current flow in the circuit. Therefore, the relay coils 19 and 25, which in this case are also in series, will not be energized and the indicator lamp 29 will not light.

It will be observed, therefore, that the indicator lamp 29 will not be energized if there is a discontinuity in either of the two branches of the equipment under test or if the two branches of the equipment under test have been incorrectly polarized or identified. Upon failure of the indicator lamp 29 to light, the operator merely switches the reversing switch 15 to the right hand (polarity reversed) position, which action effectively changes the cord to normal polarity and the circuit then reacts as described above for that polarity.

It will be observed that a failure of the indicator lamp 29 to light with the reversing switch 15 in either of its two positions will be a positive indication of discontinuity in one or both of the two conductors under test.

Besides determining continuity and polarity, the testing device also tests the pair of conductors being examined for breakdown qualities, the breakdown voltage being supplied from the secondary winding 14. The breakdown characteristics of the wire pair under test will be determined only when the contacts of both or either of the two relays 19 and 25 are operated during the polarity test. For the purposes of the explanation below, it is assumed that relay 19 has been energized by winding 12 through the outer wire under test, connecting receptacles 17 and 21, so that the contacts of relay 19 close and remain in this condition until the outer interconnecting wire is removed upon completion of the test. The breakdown voltage is applied from one side of winding 14, through conductor 24, the winding of relay 25, conductor 26, test socket or clip 27 to one of the conductors under test, and, assuming breakdown across the conductors, thence to the other conductor under test, socket or clip 21, through conductor 20, the closed contacts of relay 19, conductor 33, junction point 32, conductor 31, current limiting resistor 38, breakdown indicator lamp 30 back to the other side of winding 14. A flow of current in this circuit will, therefore, cause the breakdown indicator lamp 30 to be energized, thus giving a positive indication of breakdown across the conductors under test.

It is to be noted that the current flowing in the breakdown circuit is limited by the current limiting resistor 38 to such an extent that the breakdown current is incapable of operating the relays in the continuity testing circuit, thus no false indications of continuity will be given. It is to be further noted that it is not necessary that relay 19 be closed in order that breakdown voltage will be applied, since a similar circuit will be completed by the closing of the contacts of relay 25. It is also possible to change the design of the circuit by the addition of extra sets of contacts to the relays so that the breakdown potential can only be applied when both relays are energized.

It will be seen, therefore, that upon inserting a cord under test and energizing the test set with the switch 15 in the left hand (polarity normal) position, the lighting of indicator lamp 29 will indicate proper continuity and polarity. If the indicator lamp 29 does not light, the switch 15 can then be thrown to the right-hand (polarity reversed) position, whereupon lighting of the indicator 29 will indicate to the operator that the polarity of the cord is reversed. A failure of the indicator 29 to light in either position of the switch will indicate a discontinuity in one or both branches of the cord under test. The lighting of the breakdown indicator 30 will indicate breakdown across the cord under test at all times, regardless of the position of switch 15.

It is to be understood that the above-described arrangements are simply illustrative of the application of the principles of the invention and numerous other arrangements may be readily devised by those skilled in the art which will embody the principles of the invention and fall within the spirit and scope thereof.

What is claimed is:

1. A device for determining the electrical characteristics of a wire pair comprising a power transformer having two secondary windings, a first relay having an operating coil connecting one of said secondary windings in series with a first wire of the pair under test to form a first closed circuit when the first wire is continuous and connected in proper polarity, a second relay having an operating coil connecting the other of said secondary windings in series with a second wire of the pair under test to form a second closed circuit when the second wire is continuous and connected in proper polarity, contacts of said first and second relays being closed by the operation of said first and second relays in response to wire pair continuity and polarity, and signaling means operated by the closing of said contacts to indicate the acceptability of said wire pair under test.

2. A device for measuring the electrical characteristics of a wire pair comprising a power transformer having three secondary windings, a first relay having an operating coil connecting one of said secondary windings in series with a first wire of the pair under test to form a first closed circuit when the first wire is continuous and connected in proper polarity, a second relay having an operating coil connecting another of said secondary windings in series with a second wire of the pair under test to form a second closed circuit when the second wire is continuous and connected in proper polarity, contacts of said first and second relays being closed by the operation of said first and second relays in response to wire pair continuity and polarity, and the third of said secondary windings being connected to said wire pair the closing of either or both of said contacts for testing the breakdown characteristic of the wire pair under test.

3. A device for measuring the electrical characteristics of a wire pair comprising three sources of energy, two of said sources being equal in magnitude and the third source being of high voltage, a pair of relays having contacts controlled thereby, a reversing switch, a first circuit means connecting each of said equal sources in series with a wire of the pair under test and with an operating coil of one of said relays through said reversing switch, said reversing switch operable to connect said circuit means either into one continuous circuit wherein the two equal sources are in series opposition so that the relay cannot operate or into two separate circuits with separate energy sources for operating said relays when the wires are continuous, and second circuit means completed by the operation of either of the relays in said first circuit means so as to apply energy from the high voltage source to the wire pair under test for determining the breakdown characteristic of the pair only when one of said relays is operated.

4. A device for determining the electrical characteristics of wire pairs comprising a power transformer having three windings, two of said windings being of equal voltage and the third of said windings being of high voltage, a first relay having an operating coil connecting one equal power source in series with one wire of the pair under test, a second relay having an operating coil connecting another of the equal power sources in series with another wire of the pair under test, contact means controlled by each of the first and second relays, said contacts being closed by the operation of the first and second relays when both wires under test are of correct polarity and continuous so as to energize said operating coils and said contacts remaining open when the wire pair is connected in reversed polarity, and circuit means interconnecting said high voltage winding with said wire pair through said contacts when closed so as to apply high voltage to the wire pair only when both wires are of correct polarity.

5. A device for determining electrical characteristics of wire pairs comprising three sources of energy, two of said sources being equal in magnitude, a reversing switch, a first relay, a first circuit means connecting one of said equal sources in series with a wire of the wire pair under test through the reversing switch and an operating coil of the first relay, a second relay, a second circuit means connecting the other equal source in series with another wire of the pair under test through the reversing switch and an operating coil of the second relay, said reversing switch being either operable to interconnect the first and second circuit means with the energy sources in series opposition or operable to isolate the said two circuit means thereby to provide two separate closed circuits for operating the first and second relays when the wires of the pair are both continuous and connected in correct polarity, and a third circuit means interconnected with said first and second circuit means by the operation of the first or second relay for applying the third source of energy to the wire pair under test only when the polarity has been established so as to provide an indication of the breakdown characteristic of the wires under test.

6. A device for determining the electrical characteristics of a wire pair comprising a pair of relays having normally open contacts, a first and second source of energy each of said relays being connected in series with a wire of the pair under test so as to be energized to close its associated contact if the wires are continuous and connected in correct polarity to said sources of energy, a third source of energy, and circuit means connecting said third source of energy to the wire pair under test in response to closure of the contacts of the relays so as to apply a potential for determining the breakdown characteristics of the wire pair when the wire pair is continuous and connected in correct polarity.

7. An electrical test device comprising two pairs of test receptacles for receiving a pair of conductors to be tested, a power transformer for supplying current to the test receptacles including a pair of secondary windings on said transformer, said windings being connected 180° out of phase, one pair of test receptacles being connected across each of the secondary windings, a reversing switch for effectively reversing one of each of the pairs of test receptacles with respect to the said windings, two relays having contacts controlled thereby, an operating coil of each of said relays being connected in series circuit relationship with one of said windings and its associated test receptacles to be energized thereby when the conductor connected to said associated receptacles is continuous and connected in proper polarity, an indicating device in series circuit relationship with the contacts of said relays and adapted to be energized when the contacts of both relays are closed, a third secondary winding of said transformer being connected across the pairs of test receptacles by the operation of one of said relays, and an indicating device serially connected with said third secondary winding and said receptacle pairs for determining the breakdown characteristic of the wire pair under test.

8. A device for determining the electrical characteristics of a wire pair comprising a pair of relays having contacts controlled thereby, a pair of transformer windings having voltage outputs equal in magnitude and 180° out of phase, two pairs of testing connectors adapted to receive the wire pair under test, circuit means serially connecting an operating coil of one of the relays and one of the windings with each pair of testing connectors, each of said relays being operated to close its contact when a single wire of the pair electrically interconnects the associated pair of testing connectors, a high voltage source, and circuit means completed by the closure of one of said contacts for connecting the high voltage source to the wire pair to determine the breakdown characteristics thereof.

9. A device for determining the electrical characteristics of a wire pair comprising three sources of energy, a first pair of terminals between which is connected one of the wires of said wire pair, a second pair of terminals between which is connected the second wire of said wire pair, a first electrical circuit for applying one of said sources of energy to the first pair of terminals to determine the continuity of the wire connected therebetween, a second electrical circuit for applying a second of said sources of energy between the second pair of terminals to determine the continuity of the wire connected between said second pair, means for preventing application of said first and second sources of energy to said terminals unless the wires are connected between the terminals in proper polarity, and a third electrical circut for applying the third source of energy between one of the terminals of said first pair and one of the terminals in said second pair to test breakdown of the wire pair.

10. A device for determining the electrical characteristics of a pair of conductors comprising three sources of energy, a first pair of terminals between which is connected one of said conductors, a second pair of terminals between which is connected the other conductor, a first electrical circuit for applying one of said sources of energy to the first pair of terminals to determine the continuity of the conductor connected therebetween, a second electrical circuit for applying a second of said sources of energy between the second pair of terminals to determine the continuity of the conductor connected therebetween, means for preventing the application of said first and second sources of energy to said terminals unless the conductors are connected between the terminals in proper polarity, a switch connected between the four terminals to reverse the polarity of the wires if they are connected in improper polarity, and a third electrical circut for applying the third source of energy between one of the terminals of said first pair and one of the terminals of said second pair to determine the breakdown characteristics of the conductors under test.

11. A device for determining the electrical characteristics of a pair of conductors comprising a first electro-responsive means operated in response to the continuity of one of said conductors conmnected thereto, a second electro-responsive means operated in response to the continuity of the other of said conductors, means for preventing operation of both of said electro-responsive means unless the conductors are connected to the electro-responsive means in a predetermined polarity, and the electric circuit means energized by the operation of both of the electro-responsive means for applying high voltage to the pair of conductors to determine the breakdown characteristics thereof.

12. A device for measuring the electrical characteristics of a pair of conductors comprising a plurality of electro-responsive means, means for determining the continuity of said conductors and controlling the operation of said electro-responsive means, means responsive to said electro-responsive means for determining the polarity of said conductors, circuit means controlled by said continuity determining means and by said polarity determining means for applying a high voltage to the pair of conductors for determining the breakdown characteristics of the conductors.

ANTON L. DE BRUYNE.

REFERENCES CITED

The following references are of record in the file of this patent:

UNITED STATES PATENTS

| Number | Name | Date |
|---|---|---|
| 1,588,539 | Fortescue | June 15, 1926 |
| 1,738,710 | Jones | Dec. 10, 1929 |
| 1,950,484 | Clarvoe | Mar. 13, 1934 |
| 1,977,703 | Swartwout | Oct. 23, 1934 |
| 2,456,453 | Shailor | Dec. 14, 1948 |
| 2,481,282 | Bialous | Sept. 6, 1949 |